US012580815B1

(12) United States Patent
Venkatachalam et al.

(10) Patent No.: US 12,580,815 B1
(45) Date of Patent: Mar. 17, 2026

(54) CLOUD BASED DYNAMIC REDFISH SCHEMA UPDATES BASED ON RUN TIME HARDWARE CHANGES

(71) Applicant: American Megatrends International, LLC, Duluth, GA (US)

(72) Inventors: Hari Venkatachalam, Bangalore (IN); Chitrak Gupta, Johns Creek, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 65 days.

(21) Appl. No.: 18/887,298

(22) Filed: Sep. 17, 2024

(51) Int. Cl.
G06F 15/16 (2006.01)
H04L 41/0823 (2022.01)
H04L 67/00 (2022.01)
H04L 67/02 (2022.01)

(52) U.S. Cl.
CPC .......... H04L 41/0823 (2013.01); H04L 67/02 (2013.01); H04L 67/34 (2013.01)

(58) Field of Classification Search
CPC ...... H04L 41/0823; H04L 67/02; H04L 67/34
See application file for complete search history.

(56) References Cited

U.S. PATENT DOCUMENTS

| | | | |
|---|---|---|---|
| 2022/0114027 A1* | 4/2022 | Puthillathe | G06F 13/387 |
| 2022/0276876 A1* | 9/2022 | Drury | G06F 21/572 |
| 2024/0012779 A1* | 1/2024 | Lambert | G06F 9/4411 |
| 2025/0138886 A1* | 5/2025 | Ramamoorthy | G06F 9/5072 |

* cited by examiner

*Primary Examiner* — Normin Abedin
(74) *Attorney, Agent, or Firm* — Tim Tingkang Xia, ESQ.; TROUTMAN PEPPER LOCKE LLP

(57) ABSTRACT

In an aspect of the disclosure, a method, a computer-readable medium, and an apparatus are provided. The apparatus may be a BMC. The BMC detects the addition of a new device to a server it manages. The BMC determines that it lacks the capability to manage the new device. The BMC sends a request to a cloud service for a manageability bundle for the new device. The BMC receives the manageability bundle from the cloud service. The manageability bundle includes schema metadata and a backend service for managing the new device. The BMC installs or updates a schema of a management model based on the schema metadata and installs the backend service. The BMC exposes management capabilities for the new device through an interface of the management model without requiring a firmware update or reboot of the BMC.

20 Claims, 6 Drawing Sheets

100

400

REDFISH Client 410

D-Bus 420

D-Bus Services 432

REDFISH Schema Metadata 434

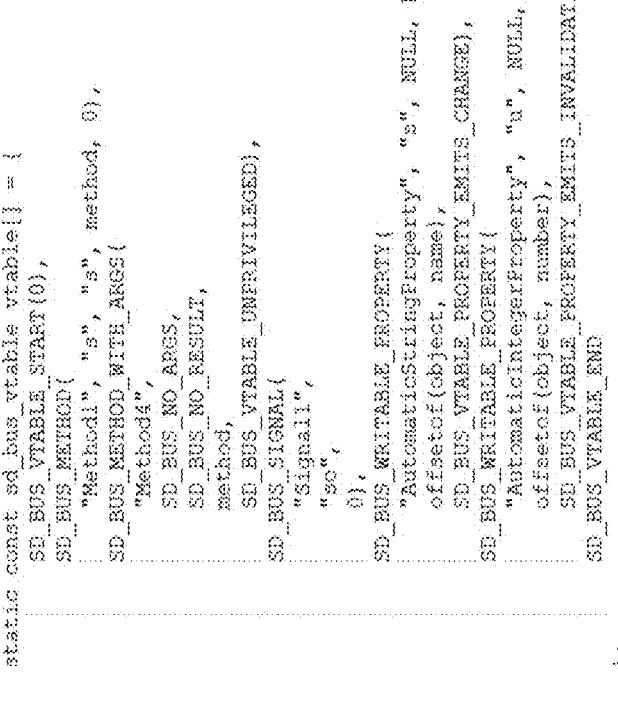

D-Bus interface definition 560

```
static const sd_bus_vtable vtable[] = {
    SD_BUS_VTABLE_START(0),
    SD_BUS_METHOD(
        "Method1", "s", "s", method, 0),
    SD_BUS_METHOD_WITH_ARGS(
        "Method4",
        SD_BUS_NO_ARGS,
        SD_BUS_NO_RESULT,
        method,
        SD_BUS_VTABLE_UNPRIVILEGED),
    SD_BUS_SIGNAL(
        "Signal1",
        "s",
        0),
    SD_BUS_WRITABLE_PROPERTY(
        "AutomaticStringProperty", "s", NULL, NULL,
        offsetof(object, name),
        SD_BUS_VTABLE_PROPERTY_EMITS_CHANGE),
    SD_BUS_WRITABLE_PROPERTY(
        "AutomaticIntegerProperty", "u", NULL, NULL,
        offsetof(object, number),
        SD_BUS_VTABLE_PROPERTY_EMITS_INVALIDATION),
    SD_BUS_VTABLE_END
};
```

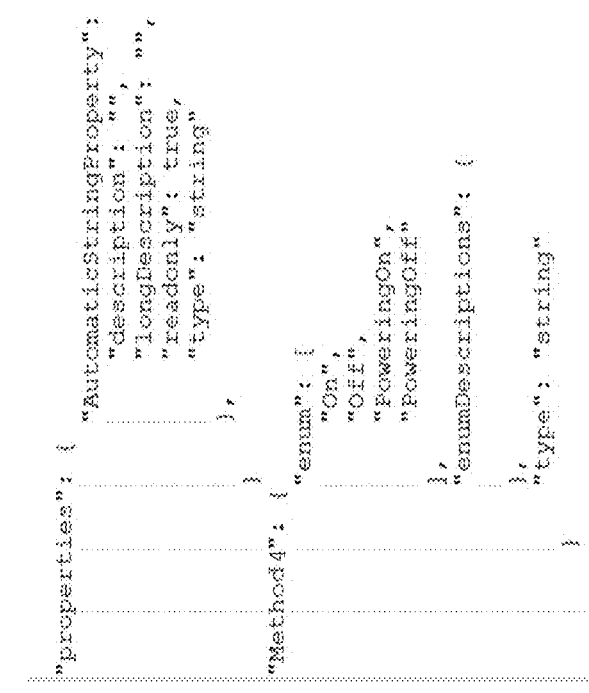

REDFISH Schema 510

```
"properties": {
    "AutomaticStringProperty": {
        "description": "",
        "longDescription": "",
        "readonly": true,
        "type": "string"
    },
    ...
    "Method4": {
        "enum": [
            "On",
            "Off",
            "PoweringOn",
            "PoweringOff"
        ],
        "enumDescriptions": {
            ...
        },
        "type": "string"
    }
}
```

CLOUD BASED DYNAMIC REDFISH SCHEMA UPDATES BASED ON RUN TIME HARDWARE CHANGES

BACKGROUND

Field

The present disclosure relates generally to computer systems, and more particularly, to techniques of dynamically updating Redfish schemas and services in a baseboard management controller (BMC) at runtime to support management of newly added or modified hardware components.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI. Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture. The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The BMC detects the addition of a new device to a server it manages. The BMC determines that it lacks the capability to manage the new device. The BMC sends a request to a cloud service for a manageability bundle for the new device. The BMC receives the manageability bundle from the cloud service. The manageability bundle includes schema metadata and a backend service for managing the new device. The BMC installs or updates a schema of a management model based on the schema metadata and installs the backend service. The BMC exposes management capabilities for the new device through an interface of the management model without requiring a firmware update or reboot of the BMC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating a dynamic update mechanism for Redfish schemas in a BMC, showing the interaction between D-Bus services and Redfish schemas.

DETAILED DESCRIPTION

Figure 1:
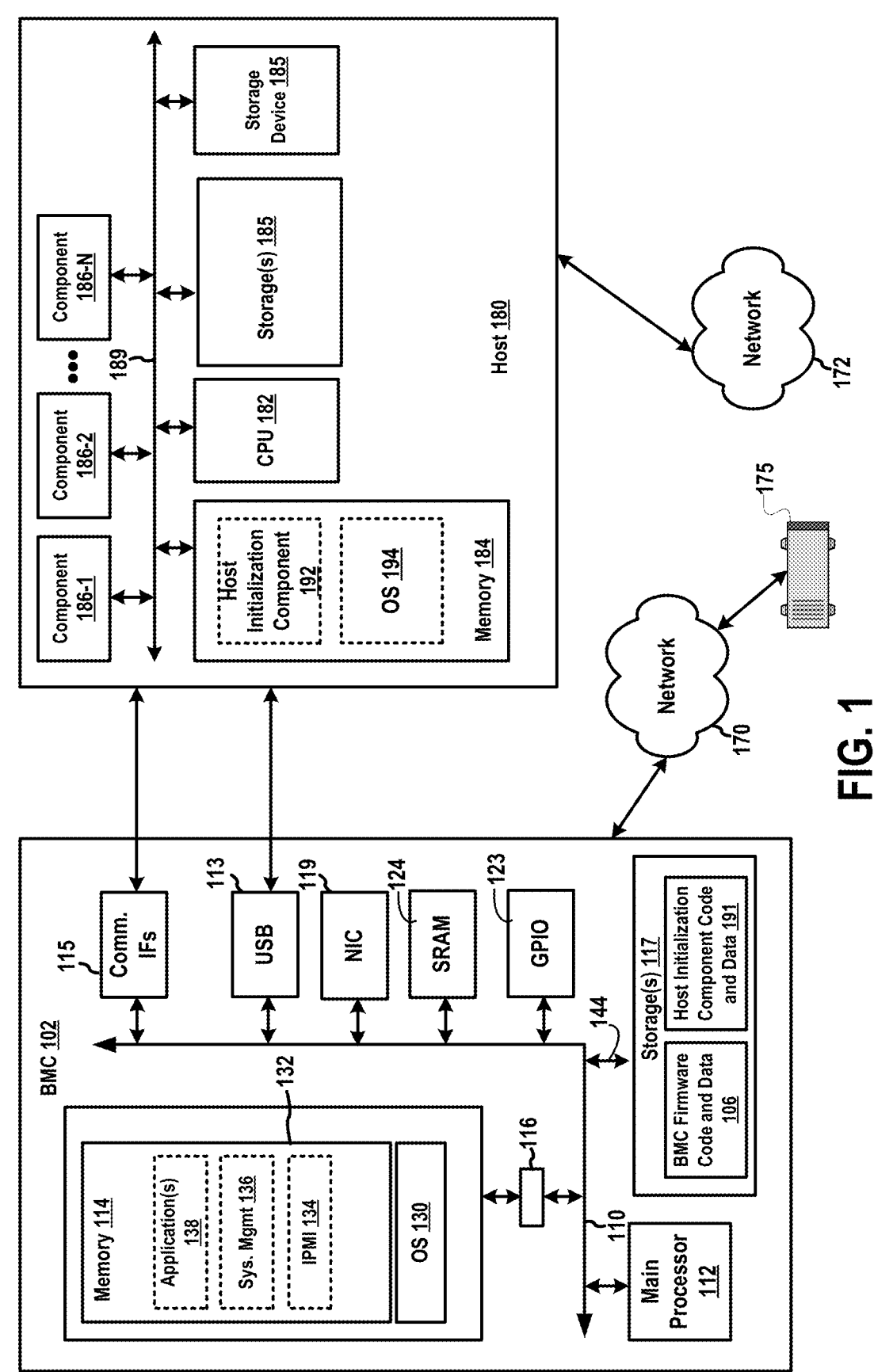
FIG. 1 is a diagram illustrating a computer system including a baseboard management controller and a host computer.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Further, the storage(s) 117 is in communication with the communication channel 110 through a communication link 144.

The BMC firmware code and data 106 and the host initialization component code and data 191 stored in the storage(s) 117 may contain sensitive information such as authentication keys, user information, and host information. Unauthorized access to this sensitive information could compromise the security of the server. Typically, server administrators implement security measures to restrict access to this sensitive data.

However, when a server is decommissioned, the storage devices may be removed or data may be erased without proper precautions. The flash memory chips containing the BMC firmware code and data 106 and the host initialization component code and data 191 are often overlooked during decommissioning. An attacker with physical access to these discarded flash memory chips can easily extract the sensitive data.

Recently, source code for many BMC and BIOS firmware has been open sourced (e.g., Open BMC and Open UEFI). This allows attackers to more easily decode the extracted firmware images. For ease of administration, servers within a datacenter often use identical BMC and BIOS firmware. Thus, compromised firmware from one discarded server could expose all servers in that datacenter.

Figure 2:
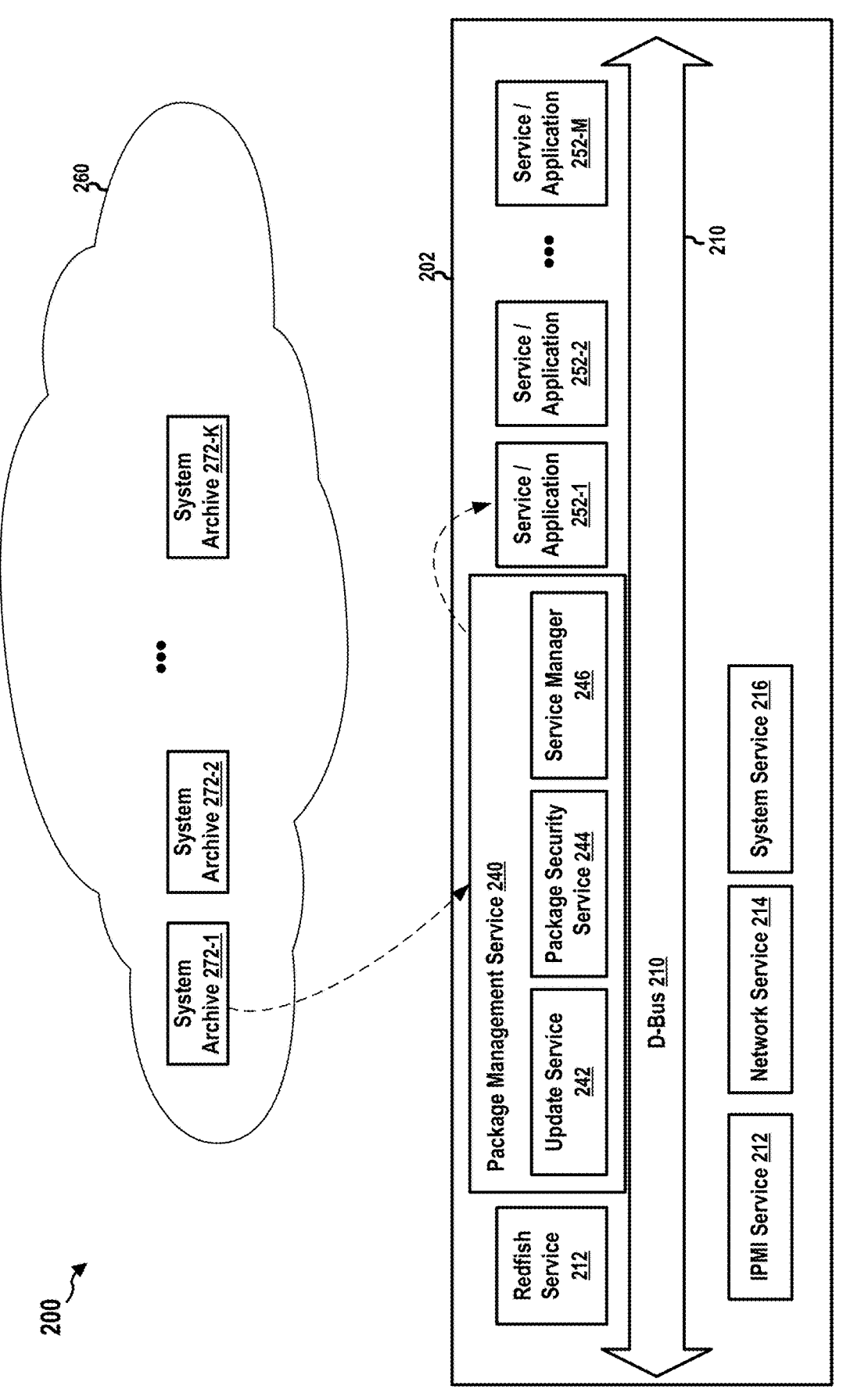
FIG. 2 is a diagram illustrating a BMC implementation with various services and cloud-based system archives.

FIG. 2 is a diagram 200 illustrating a BMC implementation. A BMC 202 is an implementation of the BMC 102. The BMC 202 executes, among other services/applications, an IPMI service 212, a network service 214, a system service 216, a REDFISH service 222, a package management service 240, services/applications 252-1, 252-2, . . . , 252-M. Cloud services 270 store system archives 272-1, 272-2, . . . , 272-K. Each of the system archives 272-1, 272-2, . . . , 272-K is a secure location where updatable packages of a corresponding service/application (e.g., one of the services/applications 252-1, 252-2, . . . , 252-M) of a BMC are kept. Further, the package management service 240 includes an update service 242, a package security service 244, and a service manager 246.

The REDFISH service 222 serves as the bridge between remote management actions and the BMC 202, enabling cloud-based package management in a secure and standard manner.

The REDFISH service 222 allows external components to interact with and send commands to the BMC 202. The REDFISH service 222 implements a RESTful interface and may utilize standard HTTP(S) and JSON to provide access to data center hardware management functions.

The REDFISH service 222 provides the REDFISH API, which is the mechanism of communication between a remote management console and the BMC 202 for package management-related operations. The operations may include activities such as installing new software, updating existing software, or removing software from the system.

Original Equipment Manufacturer (OEM) REDFISH APIs are extensions made to the REDFISH standard. The REDFISH service 222 implements certain OEM REDFISH APIs to facilitate the package management service 240, which is responsible for deploying updates to the BMC 202 at runtime without requiring a full system reboot or firmware upgrade.

REDFISH creates a standardized, secure, and scalable interface for systems management. By extending the standard REDFISH schema with OEM-specific properties and methods, the REDFISH service 222 can provide custom functionalities beyond the core REDFISH model. These OEM extensions can include additional APIs necessary for the package management service 240.

Using OEM extensions to REDFISH, users or administrators can issue commands from their management consoles or remotely via secure HTTP requests. These commands could be to check for package updates, initiate installation or removal of packages, and query the status of package deployments. Commands are formatted according to the REDFISH specifications and include OEM-specific instructions for the package management service 240.

Once a command is issued to the REDFISH service 222 through the OEM REDFISH APIs, the command is received by the REDFISH service endpoint. The REDFISH service 222 interprets the request, performs any necessary authentication and authorization checks, and passes the command details to the package management service 240. For example, the REDFISH service 222 may pass the command details to the package management service 240 via the D-bus 210.

As such, through the OEM REDFISH APIs provided by the REDFISH service 222, operators or automated systems can send specific package management commands to the BMC 202 to manage packages. These commands may be packaged as API calls (typically HTTP requests) that conform to the REDFISH standard.

Once the package management commands are sent through the REDFISH interface, they are received by the package management service 240 running on the BMC 202. The package management service 240 is responsible for initiating and managing the actions requested through the REDFISH API calls. In particular, the package management service 240 interacts with the cloud services 270. It is from this repository that the package management service 240 will fetch the software packages needed for installation or updates.

The package management service 240 of the BMC 202 has the capability to install, remove, and upgrade packages during the runtime of the system. The cloud services 270 provides packages that can be installed or updated on the BMC 202. Similar to the functionality available in Linux distributions, a user can use package management commands such as "apt install <pkg-name>" to manage (e.g., install, updat, or remove) software packages. This functionality is made possible through the use of the REDFISH Software Installation service of the REDFISH service 222, as described supra.

The package management service 240 supports various package file formats for software deployment within the BMC 202. For example, RPM (Red Hat Package Manager) and DEB (Debian package) may be supported. RPM and DEB are common packaging formats used in Linux distributions for managing individual software packages, which contain the executable, configuration files, and metadata relevant to the software. This conformity to widely adopted packaging standards facilitates interoperability and the use of established tools and practices in package management.

The Redfish standard has become a widely adopted industry standard for managing and monitoring devices in data center environments, from standalone servers to complex cloud infrastructures. It utilizes a RESTful interface to access a schema-based model, providing a standardized approach to perform management operations. This standardization allows for easier integration and interoperability across different systems and vendors.

This schema-based model provides a structured and standardized way to describe the various components and functionalities of devices, enabling consistent management and monitoring across different vendors and platforms. A Redfish schema is a formal definition that outlines the structure and properties of a particular resource or entity within the Redfish data model. These schemas are typically defined using standard formats like OpenAPI YAML, OData CSDL, and JSON. A schema-based model defines the properties, methods, and relationships of the various components within a system, such as the BMC 202 and its associated services/applications 252-1, 252-2, . . . , 252-M. By adhering to a schema-based model, management operations can be performed in a consistent and predictable manner, facilitating easier integration and management of diverse hardware and software components.

In a first configuration, Redfish implementations require build-time changes to update any existing schema or API. This implementation extends to cases where support for new devices needs to be added. Consequently, any modifications or additions to the Redfish implementation necessitate a firmware update, which invariably results in server downtime.

This requirement for firmware updates poses a substantial problem for data centers, which generally aim to minimize downtime to maintain continuous operations and service availability. Data center operators are often reluctant to perform firmware upgrades due to the associated downtime, which can lead to service interruptions and potential revenue loss.

The problem is further exacerbated by the ongoing trend in data center design towards modularity and composability. In these modern architectures, there is a growing need for dynamic detection of management entities and updates to the schema to support the manageability of newly added or modified components. For instance, an accelerator might be aggregated to a node at runtime, a storage enclosure could be hot-plugged, or a new compute resource might be composed based on distributed devices. The current Redfish implementation lacks the flexibility to adapt to these dynamic changes without requiring a system-wide firmware update.

More specifically, in this first configuration, the REDFISH service 222 employs a schema-based model accessed through a RESTful interface to perform management operations on devices like servers within data centers or cloud environments. However, a significant limitation of current Redfish implementations is the necessity for build-time changes to update or modify schemas or APIs. This requirement extends to instances where support for new devices needs to be added.

The process of updating or adding new schemas and their corresponding backend libraries, such as those stored in the system archives 272-1, 272-2, . . . , 272-K, typically involves updating the BMC firmware, which in turn necessitates a server downtime. Data centers generally avoid firmware upgrades due to the resulting server downtime. This is further exacerbated in modern data centers that are increasingly adopting modularity and composability. In such dynamic environments, where compute, storage and network resources are abstracted and pooled as needed, the ability to dynamically detect and manage new devices and update the corresponding Redfish schema without requiring firmware updates and server downtime becomes desired.

For instance, in a composable infrastructure, an accelerator might be added to a node at runtime, a storage enclosure might be hot-plugged, or a new compute node might be composed from a collection of distributed devices. These scenarios underscore the need for a mechanism that allows the BMC 202 to detect these changes in hardware configuration and to update its Redfish schema and associated backend services without disrupting ongoing operations.

As such, the first configuration, under which schemas and libraries are updated as part of the BMC firmware image stored in the storage(s) 117, is inadequate for the evolving needs of modern data centers. It limits flexibility, increases management overhead, and introduces the risk of downtime, which is particularly undesirable in high-availability environments.

In one example under the first configuration, when new devices are introduced and existing devices evolve, the Redfish schemas need to be updated to reflect these changes. Updating or adding new Redfish schemas to a BMC 202, such as the schemas for services/applications 252-1, 252-2, . . . , 252-M, requires modifications to the BMC firmware 106 stored in the storage(s) 117. This necessitates a firmware update, which typically involves taking the server offline, resulting in downtime. This downtime is undesirable in data center environments where high availability and continuous operation are desired.

The need for firmware updates to incorporate Redfish schema changes poses a significant challenge, particularly modern data centers that are increasingly moving towards composable architectures. In a composable infrastructure, resources such as compute, storage, and networking are abstracted and can be dynamically provisioned and configured as needed. For example, an accelerator might be added to a host computer 180 at runtime, a storage enclosure might be hot-plugged, or a new compute node might be composed from distributed devices.

In such scenarios, the BMC 202 needs to be able to detect these changes in hardware configuration and update its Redfish schema accordingly to manage the newly added or modified resources. If the BMC 202 relies on build-time firmware updates to incorporate new Redfish schemas, it would not be able to adapt to these runtime changes without interrupting operations.

A second configuration addresses the limitations of Redfish implementations in the first configuration by introducing a process to update Redfish services at runtime. This configuration may significantly enhance the flexibility and adaptability of the BMC 202 in managing dynamic hardware configurations without requiring system-wide firmware updates or server downtime.

The Redfish schemas and their corresponding backend libraries may be hosted on the cloud services 270. This cloud-based storage serves as a centralized repository for system archives 272-1, 272-2, . . . , 272-K, each containing updatable packages for various services/applications 252-1, 252-2, . . . , 252-M of the BMC 202. During an update operation, the BMC 202 can download and install these schemas and libraries as needed, allowing for real-time adaptation to changes in hardware configuration.

The package management service 240 includes an update service 242, a package security service 244, and a service manager 246, which collectively manage the retrieval, verification, and installation of new schemas and libraries. When new schemas and libraries are pushed to the BMC 202, the Redfish services can immediately consume these updates, enabling the provision of updated resources during discovery operations without necessitating a system reboot.

The second configuration utilizes D-Bus as the standard inter-process communication (IPC) mechanism in the OpenBMC architecture. The newly deployed Redfish service can transpose D-Bus interfaces to REST APIs, facilitating integration with existing management tools and protocols. For instance, a newly added schema defines the required properties, methods, and relationships, while the corresponding library provides the implementation to transpose D-Bus interfaces to REST APIs.

To support this dynamic update mechanism, a metadata file is provided for each new resource. This file defines the Uniform Resource Identifier (URI) for the new resource and specifies the required privileges, enabling proper access control and integration with existing management systems.

Figure 3:
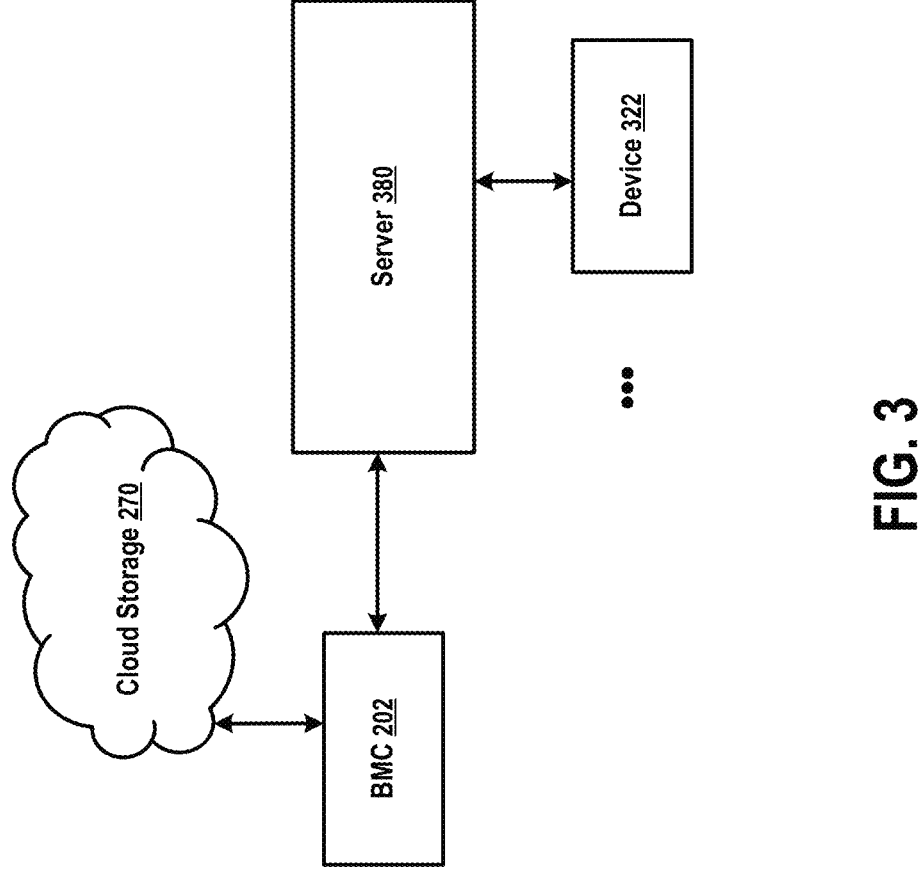
FIG. 3 is a diagram illustrating a dynamic Redfish schema update process for a BMC managing a server with a newly added device.

FIG. 3 is a diagram 300 illustrating a dynamic Redfish schema update process for the BMC 202. In this example, the BMC 202 manages a server 380. A device 322 is newly added to the server 380. The BMC 202 is in communication with the cloud services 270.

When the device 322 is added to the server 380, the BMC 202 can detect this change in the inventory through an inventory management service. This service operates by either polling the device buses or receiving asynchronous events from hotplug or composition activities.

Upon detecting the new device 322, the BMC 202 initiates a series of actions to manage the newly added hardware. First, the BMC 202 identifies the device, typically through its PCI device ID if it's a PCI device, or through other identifying information for different types of hardware such as storage devices.

If the BMC 202 determines that it lacks the necessary capabilities to manage the new device 322 based on its current configuration, it invokes an API to request a manageability bundle from the cloud services 270. This API call allows the BMC 202 to adapt to new hardware configurations without requiring a full system reboot or firmware update.

The cloud services 270 may manage a build orchestration pipeline. When it receives the request from the BMC 202, the build orchestrator within the cloud services 270 constructs a Redfish schema bundle. This bundle includes the schema metadata extensions and the backend services necessary to handle Redfish requests for the new device 322.

In some cases, the new device 322 may have an existing schema, but not all facilities are available. In such scenarios, the BMC 202 may request an update to both the schema and the backend libraries. This flexibility allows for partial updates.

Once the Redfish schema bundle is prepared, it is transmitted from the cloud services 270 to the BMC 202. The package management service 240 of the BMC 202 then manages the installation of this bundle. The update service 242 handles the deployment of the new schema and libraries, while the package security service 244 verifies the integrity and authenticity of the downloaded bundle.

After the new schema and libraries are installed, the service manager 246 integrates them into the existing Redfish service structure. This may involve restarting specific services rather than rebooting the entire BMC 202, significantly reducing downtime. The newly deployed Redfish service can then transpose the D-Bus interfaces to REST APIs, making the new device 322 immediately manageable through standard Redfish protocols. By allowing for runtime updates of Redfish schemas and backend services, this approach minimizes server downtime and enhances the flexibility of data center management.

The concept of composable infrastructure represents a significant shift in data center architecture. In this paradigm, the traditional pillars of system infrastructure—compute, storage, and network resources—are abstracted and can be dynamically pooled as required.

The runtime deployment in the second configuration of the BMC 202 enables the dynamic download and installation of required schemas and libraries from the cloud services 270. This second configuration facilitates the creation of infrastructure that can adapt to changing needs without requiring system-wide downtime or firmware updates.

For example, when a new device 322 is added to the server 380, the BMC 202 can detect this change and dynamically update its management capabilities. The package management service 240 manages the retrieval of appropriate schemas and libraries from the system archives 272-1, 272-2, . . . , 272-K stored in the cloud services 270, verifies their integrity, and integrates them into the existing Redfish service structure. For instance, if an accelerator is aggregated to a node at runtime, a storage enclosure is hot-plugged, or a new compute resource is composed from distributed devices, the BMC 202 can adapt its management capabilities accordingly. The REDFISH service 222, utilizing the newly downloaded schemas and libraries, can expose these new resources through its RESTful interface, making them immediately manageable without requiring a system reboot or firmware update.

In another instance, if a specific application requires additional storage capacity, the cloud services 270, in conjunction with the package management service 240, can dynamically allocate additional storage resources to the server 380 and update the REDFISH schema to reflect this change.

The D-Bus 210, serving as the standard IPC mechanism in the OpenBMC architecture, allows the newly deployed Redfish services to transpose D-Bus interfaces to REST APIs, facilitating integration with existing management tools and protocols. This transposition enables the BMC 202 to expose new or updated resources through standardized Redfish interfaces, maintaining compatibility with existing management systems while accommodating new hardware configurations.

This process eliminates the need for manual intervention or server downtime, allowing for a more agile and responsive infrastructure. The runtime deployment techniques in the second configuration enables this dynamic resource provisioning by facilitating the download and installation of the necessary Redfish schemas and libraries from the secure cloud services 270.

Figure 4:
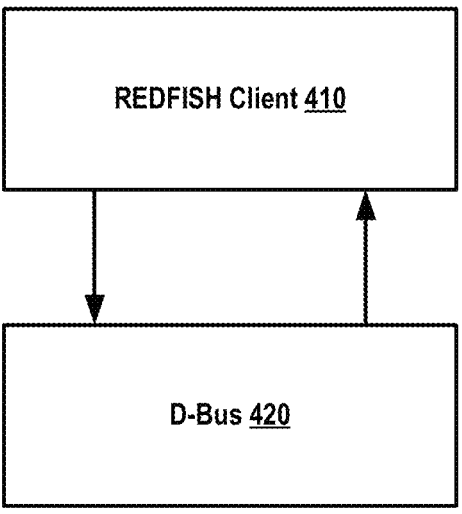
FIG. 4 is a diagram illustrating the interaction between a Redfish client and D-Bus services through a D-Bus, along with the Redfish schema metadata.

FIG. 4 is a diagram 400 illustrating the interaction between a Redfish client 410 and D-Bus services 432 through a D-Bus 420, along with the Redfish schema metadata 434. This diagram represents the architecture for dynamically updating Redfish schemas and services in the BMC 202.

A Redfish client 410, which could be a remote management console or an automated system, interacts with the BMC 202 through the REDFISH service 222. The REDFISH service 222, in turn, communicates with various D-Bus services 432 through the D-Bus 420. These D-Bus services 432 represent the backend implementations of different functionalities or resources within the BMC 202, such as the IPMI service 212, the network service 214, the system service 216, and other services/applications 252-1, 252-2, . . . , 252-M.

The D-Bus services 432 represent a group of processes waiting for requests from clients. These services can include various functionalities such as I2C read/write services, PCI read/write services, or specific device management services like GPU collection services. The D-Bus services 432 expose methods and properties that top-level applications, such as the Redfish client 410, can access and manipulate.

The Redfish schema metadata 434 defines the structure and properties of the resources managed by the BMC 202. This metadata is part of the manageability bundle, which also includes the backend services capable of handling Redfish requests. When a new device is added to the server 380, the package management service 240 can update this metadata and the corresponding D-Bus services 432 to accommodate the new hardware. When a Redfish client 410 sends a request, the REDFISH service 222 utilizes the Redfish schema metadata 434 to interpret the request and route it to the appropriate D-Bus service 432. The D-Bus service 432 then performs the requested operation and returns the result to the REDFISH service 222, which formats the response according to the Redfish schema and sends it back to the Redfish client 410.

In cases where a new device can be added to an existing schema, the process involves updating both the existing schema in the Redfish schema metadata 434 and the corresponding backend services in the D-Bus services 432. If the addition of a device requires a completely new schema, new metadata and D-Bus services are added to the system.

The D-Bus 420 uses ObjectPaths to define the path of an object under a service. For example, if there are multiple GPUs in the system, they might be represented by ObjectPaths such as /GPU1, /GPU2, and /GPU3. Each of these ObjectPaths is associated with a service interface that defines properties, management methods, and any asynchronous events related to that specific GPU.

An Interface, which can be considered a class of an Object, defines the properties, methods, and signals/events associated with a particular service. For instance, a GPU interface may include properties such as temperature and utilization, methods for adjusting clock speeds, and signals for overheating events.

The REDFISH service 222 exposes these D-Bus interfaces as REST APIs, allowing the Redfish client 410 to interact with the underlying hardware and services using standard HTTP methods as well as standard Redfish protocols and tools. This abstraction layer enables the BMC 202 to present a consistent management interface even as the underlying hardware configuration changes. That is, a Redfish service can open up an interface on the D-Bus that directly corresponds to the Redfish schema. For example, if the Redfish schema defines a property for "GPU sensor reading", a corresponding property would be defined in the GPU interface on the D-Bus. The backend services associated with the GPU would then read the sensor data from the GPU, potentially through I2C or PCI commands, and map that data to the D-Bus interface. The Redfish service would then retrieve the data from the D-Bus interface and format it according to the Redfish schema before sending it to the Redfish client.

When a new schema or service is added, or an existing one is updated, the package management service 240 manages the process of integrating these changes into the running system. The update service 242 handles the deployment of new schemas and libraries, while the package security service 244 verifies the integrity and authenticity of the updates.

In cases where a new device requires a completely new schema, the corresponding metadata and D-Bus services need to be added. If a device addition requires an update to an existing schema, the schema version can be incremented with a minor version change. If a device addition requires a completely new schema, additions are required to the metadata database.

This dynamic update mechanism allows the BMC 202 to adapt to changes in hardware configuration without requiring a full system reboot or firmware update. For example, if a new GPU is added to the server 380, the BMC 202 can download the necessary schema updates and backend services from the cloud services 270, integrate them into the Redfish schema metadata 434 and D-Bus services 432, and make the new device immediately manageable through the existing Redfish interface.

FIG. 5 is a diagram 500 illustrating a dynamic update mechanism for Redfish schemas in the BMC 202, which relies on the interaction between D-Bus services and Redfish schemas. This interaction is facilitated through a mapping process that allows the BMC 202 to expose D-Bus interfaces as RESTful APIs, which are then consumed by Redfish clients.

A Redfish schema 510 defines properties and methods that describe a particular resource or functionality within the BMC 202. In this case, "AutomaticStringProperty" includes a description, type, and enumeration of possible values. This property likely represents a state or setting that can be queried or modified through the Redfish interface.

D-Bus interface definition 560 uses the sd_bus_vtable structure, which is part of the systemd library commonly used in Linux systems for D-Bus communication. The SD_BUS_WRITABLE_PROPERTY macro defines a property that can be read and written, corresponding to the "AutomaticStringProperty" in the Redfish schema.

The SD_BUS_METHOD and SD_BUS_METHOD_WITH_ARGS macros define methods that can be called on this D-Bus interface. These correspond to operations that can be performed through the Redfish API. For instance, "Method4" in the D-Bus interface might correspond to the "Method4" in the Redfish schema.

The SD_BUS_SIGNAL macro defines a signal that can be generated by the D-Bus service. This may be used to implement asynchronous notifications in the Redfish API, allowing clients to be informed of changes or events without constant polling.

When a Redfish client sends a request to the BMC 202, the REDFISH service 222 interprets this request based on the Redfish schema. It then translates this request into appropriate D-Bus method calls or property accesses on the corresponding D-Bus service. The D-Bus service performs the requested operation and returns the result, which the REDFISH service 222 then formats according to the Redfish schema before sending it back to the client.

This mapping mechanism allows for a flexible and extensible system. When new devices or functionalities are added to the server 380, new D-Bus services can be created to manage these devices. The corresponding Redfish schemas can then be updated or created to expose these new functionalities through the Redfish API. The package management service 240 manages this process, downloading and installing new schemas and D-Bus services as needed from the cloud services 270.

Figure 6:
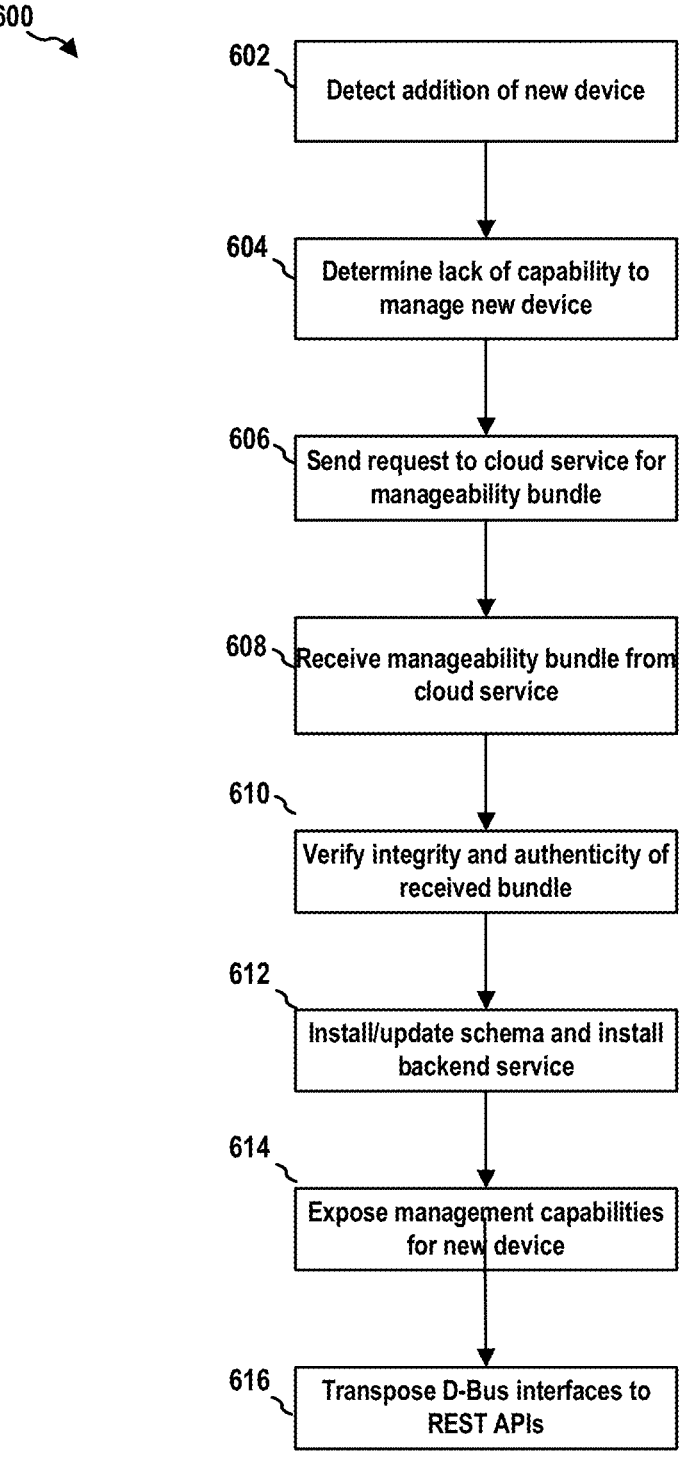
FIG. 6 is a flow chart of a method (process) for dynamically updating management capabilities of a baseboard management controller (BMC).

FIG. 6 is a flow chart 600 of a method (process) for dynamically updating management capabilities of a baseboard management controller (BMC). The method may be performed by a BMC (e.g., the BMC 202). In operation 602, the BMC detects addition of a new device to a server managed by the BMC. In certain configurations, detecting addition of the new device comprises receiving an asynchronous event from a hotplug or composition activity. In certain configurations, detecting addition of the new device comprises polling device buses to detect changes in device inventory.

In operation 604, the BMC determines that it lacks capability to manage the new device. To determine that the BMC lacks capability, the BMC may identify the new device based on a device identifier and determines that existing schemas and services on the BMC do not support management of the identified device.

In operation 606, the BMC sends a request to a cloud service for a manageability bundle for the new device. In operation 608, the BMC receives the manageability bundle from the cloud service. The manageability bundle includes schema metadata and a backend service for managing the new device. In certain configurations, the schema metadata is included in a metadata file of the manageability bundle. The metadata file defines a Uniform Resource Identifier (URI) for a new resource corresponding to the new device and specifies required privileges for accessing the new resource.

In operation 610, the BMC verifies integrity and authenticity of the received manageability bundle before installing or updating the schema and installing the backend service. In operation 612, the BMC installs or updates a schema of a management model based on the schema metadata and installs the backend service on the BMC. To install the backend service, the BMC integrates the backend service with existing D-Bus services of the BMC. In certain configurations, installing the backend service comprises restarting specific services affected by the installation without rebooting the entire BMC.

In operation 614, the BMC exposes management capabilities for the new device through an interface of the management model without requiring a firmware update or reboot of the BMC. In certain configurations, the management model is a Redfish model and the interface is a Redfish interface. In operation 616, the BMC transposes D-Bus interfaces of the installed backend service to REST APIs corresponding to the schema of the management model. To do this, the BMC maps D-Bus interfaces of the backend service to REST APIs exposed through the interface of the management model.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of a baseboard management controller (BMC), comprising:

detecting addition of a new device to a server managed by the BMC;

determining that the BMC lacks capability to manage the new device;

sending a request to a cloud service for a manageability bundle for the new device;

receiving the manageability bundle from the cloud service, the manageability bundle including schema metadata and a backend service for managing the new device;

installing or updating a schema of a management model based on the schema metadata and installing the backend service on the BMC; and exposing management capabilities for the new device through an interface of the management model without requiring a firmware update or reboot of the BMC.

2. The method of claim 1, wherein the management model is a Redfish model and the interface is a Redfish interface.

3. The method of claim 1, further comprising:

transposing D-Bus interfaces of the installed backend service to REST APIs corresponding to the schema of the management model.

4. The method of claim 1, wherein detecting addition of the new device comprises:

receiving an asynchronous event from a hotplug or composition activity; or polling device buses to detect changes in device inventory.

5. The method of claim 1, wherein the schema metadata is included in a metadata file of the manageability bundle, the metadata file defining a Uniform Resource Identifier (URI) for a new resource corresponding to the new device and specifying required privileges for accessing the new resource.

6. The method of claim 1, wherein installing the backend service comprises:

integrating the backend service with existing D-Bus services of the BMC.

7. The method of claim 1, further comprising:

verifying integrity and authenticity of the received manageability bundle before installing or updating the schema and installing the backend service.

8. The method of claim 1, wherein determining that the BMC lacks capability comprises:

identifying the new device based on a device identifier; and determining that existing schemas and services on the BMC do not support management of the identified device.

9. The method of claim 1, further comprising:

mapping D-Bus interfaces of the backend service to REST APIs exposed through the interface of the management model.

10. The method of claim 1, wherein installing the backend service comprises:

restarting specific services affected by the installation without rebooting the entire BMC.

11. A baseboard management controller (BMC), comprising:

a memory; and at least one processor coupled to the memory and configured to:

detect addition of a new device to a server managed by the BMC;

determine that the BMC lacks capability to manage the new device;

send a request to a cloud service for a manageability bundle for the new device;

receive the manageability bundle from the cloud service, the manageability bundle including schema metadata and a backend service for managing the new device;

install or update a schema of a management model based on the schema metadata and install the backend service on the BMC; and expose management capabilities for the new device through an interface of the management model without requiring a firmware update or reboot of the BMC.

12. The BMC of claim 11, wherein the management model is a Redfish model and the interface is a Redfish interface.

13. The BMC of claim 11, wherein the at least one processor is further configured to:

transpose D-Bus interfaces of the installed backend service to REST APIs corresponding to the schema of the management model.

14. The BMC of claim 11, wherein to detect addition of the new device, the at least one processor is configured to:

receive an asynchronous event from a hotplug or composition activity; or poll device buses to detect changes in device inventory.

15. The BMC of claim 11, wherein the schema metadata is included in a metadata file of the manageability bundle, the metadata file defining a Uniform Resource Identifier (URI) for a new resource corresponding to the new device and specifying required privileges for accessing the new resource.

16. The BMC of claim 11, wherein to install the backend service, the at least one processor is configured to:

integrate the backend service with existing D-Bus services of the BMC.

17. The BMC of claim 11, wherein the at least one processor is further configured to:

verify integrity and authenticity of the received manageability bundle before installing or updating the schema and installing the backend service.

18. The BMC of claim 11, wherein to determine that the BMC lacks capability, the at least one processor is configured to:

identify the new device based on a device identifier; and determine that existing schemas and services on the BMC do not support management of the identified device.

19. The BMC of claim 11, wherein the at least one processor is further configured to:

map D-Bus interfaces of the backend service to REST APIs exposed through the interface of the management model.

20. A non-transitory computer-readable medium storing computer executable code for operation of a baseboard management controller (BMC), comprising code to:

detect addition of a new device to a server managed by the BMC;

determine that the BMC lacks capability to manage the new device;

send a request to a cloud service for a manageability bundle for the new device;

receive the manageability bundle from the cloud service, the manageability bundle including schema metadata and a backend service for managing the new device;

install or update a schema of a management model based on the schema metadata and install the backend service on the BMC; and expose management capabilities for the new device through an interface of the management model without requiring a firmware update or reboot of the BMC.

\* \* \* \* \*